(12) United States Patent
Kimura et al.

(10) Patent No.: US 11,632,266 B2
(45) Date of Patent: Apr. 18, 2023

(54) DEVICE SETTING CONTROL DEVICE, NETWORK SYSTEM, DEVICE SETTING METHOD, AND PROGRAM

(71) Applicant: Nippon Telegraph and Telephone Corporation, Tokyo (JP)

(72) Inventors: Hideaki Kimura, Tokyo (JP); Erina Takeshita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 208 days.

(21) Appl. No.: 17/284,365

(22) PCT Filed: Oct. 2, 2019

(86) PCT No.: PCT/JP2019/038886
§ 371 (c)(1),
(2) Date: Apr. 9, 2021

(87) PCT Pub. No.: WO2020/080103
PCT Pub. Date: Apr. 23, 2020

(65) Prior Publication Data
US 2021/0351955 A1    Nov. 11, 2021

(30) Foreign Application Priority Data
Oct. 16, 2018 (JP) .............................. JP2018-194785

(51) Int. Cl.
*H04L 12/62* (2006.01)
*H04L 12/46* (2006.01)

(52) U.S. Cl.
CPC ........ *H04L 12/462* (2013.01); *H04L 12/4679* (2013.01)

(58) Field of Classification Search
CPC ........................................................ H04L 12/62
(Continued)

(56) References Cited

U.S. PATENT DOCUMENTS

| 2016/0006605 | A1* | 1/2016 | Tsutsumi | H04L 41/0803 709/220 |
| 2017/0212821 | A1* | 7/2017 | Ikki | G06F 11/3051 |
| 2018/0241620 | A1* | 8/2018 | Wei | H04L 41/0806 |

FOREIGN PATENT DOCUMENTS

| JP | 5254196 | 8/2013 |
| JP | 2017-183925 | 10/2017 |
| JP | 2017-220812 | 12/2017 |

* cited by examiner

*Primary Examiner* — Sibte H Bukhari
(74) *Attorney, Agent, or Firm* — Fish & Richardson P.C.

(57) ABSTRACT

An object is to provide a means for causing wirings and device setting configurations to conform between communication devices and then establishing communication by generating a device setting configuration in accordance with wirings between the communication devices and reflecting the device setting configuration in interfaces of the communication devices. A device setting configuration for establishing communication between communication devices is generated based on information regarding an adjacent device acquired from each communication device, using a network setting information database configured to hold, in an associated manner, information regarding the communication device, information regarding the adjacent device connected directly to the communication device via a communication cable, and information regarding a device setting configuration to be set for an interface of the communication device used to connect to the adjacent device.

4 Claims, 11 Drawing Sheets

(58) Field of Classification Search
USPC .......................................................... 370/256
See application file for complete search history.

NETWORK SETTING INFORMATION DATABASE 11

| DEVICE | ADJACENT DEVICE | DEVICE SETTING CONFIGURATION INFORMATION |
|---|---|---|
| COMMUNICATION DEVICE 21 | COMMUNICATION DEVICE 22 | [SETTING 213-1]<br>FOR EXAMPLE:<br>  switchport acccess<br>  vlan 100<br>... |
| COMMUNICATION DEVICE 22 | COMMUNICATION DEVICE 21 | [SETTING 223-1]<br>FOR EXAMPLE:<br>  switchport access<br>  vlan 100<br>... |
| COMMUNICATION DEVICE 22 | COMMUNICATION DEVICE 2x | [SETTING 223-2]<br>FOR EXAMPLE:<br>  switchport trunk<br>... |
| COMMUNICATION DEVICE 2x | COMMUNICATION DEVICE 22 | [SETTING 2x3-1]<br>FOR EXAMPLE:<br>  switchport trunk<br>... |

Fig. 4

ADJACENT DEVICE INFORMATION DATABASE 13

| CORRESPONDING DEVICE INFORMATION | | ADJACENT DEVICE INFORMATION | |
|---|---|---|---|
| DEVICE | INTERFACE | DEVICE | INTERFACE |
| COMMUNICATION DEVICE 21 | 213-1 | COMMUNICATION DEVICE 22 | 223-1 |
| COMMUNICATION DEVICE 22 | 223-1 | COMMUNICATION DEVICE 21 | 213-1 |
| COMMUNICATION DEVICE 22 | 223-2 | COMMUNICATION DEVICE 2x | 2x3-1 |
| COMMUNICATION DEVICE 2x | 2x3-1 | COMMUNICATION DEVICE 22 | 223-2 |

Fig. 5

NETWORK SETTING INFORMATION DATABASE 31

| DEVICE | INTERFACE | DEVICE SETTING CONFIGURATION INFORMATION |
|---|---|---|
| COMMUNICATION DEVICE 21 | 213-1 | [ SETTING 213-1 ]<br>FOR EXAMPLE:<br>   switchport acccess<br>   vlan 100<br>... |
| COMMUNICATION DEVICE 22 | 223-1 | [ SETTING 223-1 ]<br>FOR EXAMPLE:<br>   switchport access<br>   vlan 100<br>... |
| COMMUNICATION DEVICE 22 | 223-2 | [ SETTING 223-2 ]<br>FOR EXAMPLE:<br>   switchport trunk<br>... |
| COMMUNICATION DEVICE 2x | 2x3-1 | [ SETTING 2x3-1 ]<br>FOR EXAMPLE:<br>   switchport trunk<br>... |

Fig. 9

NETWORK CONNECTION INFORMATION DATABASE 32

| DEVICE A | | DEVICE B | |
|---|---|---|---|
| DEVICE | INTERFACE | DEVICE | INTERFACE |
| COMMUNICATION DEVICE 21 | 213-1 | COMMUNICATION DEVICE 22 | 223-1 |
| COMMUNICATION DEVICE 22 | 223-2 | COMMUNICATION DEVICE 2x | 2x3-1 |

Fig. 10

ADJACENT DEVICE INFORMATION DATABASE 33

| CORRESPONDING DEVICE INFORMATION | | ADJACENT DEVICE INFORMATION | |
|---|---|---|---|
| DEVICE | INTERFACE | DEVICE | INTERFACE |
| COMMUNICATION DEVICE 21 | 213-1 | COMMUNICATION DEVICE 22 | 223-1 |
| COMMUNICATION DEVICE 22 | 223-1 | COMMUNICATION DEVICE 21 | 213-1 |
| COMMUNICATION DEVICE 22 | 223-2 | COMMUNICATION DEVICE 2x | 2x3-1 |
| COMMUNICATION DEVICE 2x | 2x3-1 | COMMUNICATION DEVICE 22 | 223-2 |

ADJACENT DEVICE INFORMATION DATABASE 33 (In)

| CORRESPONDING DEVICE INFORMATION | | ADJACENT DEVICE INFORMATION | |
|---|---|---|---|
| DEVICE | INTERFACE | DEVICE | INTERFACE |
| COMMUNICATION DEVICE 21 | 213-1 | COMMUNICATION DEVICE 22 | 223-1 |
| COMMUNICATION DEVICE 22 | 223-1 | COMMUNICATION DEVICE 21 | 213-1 |
| COMMUNICATION DEVICE 22 | 223-2 | COMMUNICATION DEVICE 2x | 2x3-1 |
| COMMUNICATION DEVICE 2x | 2x3-1 | COMMUNICATION DEVICE 22 | 223-2 |

NETWORK CONNECTION INFORMATION DATABASE 32 (Ii)

| DEVICE A | | DEVICE B | |
|---|---|---|---|
| DEVICE | INTERFACE | DEVICE | INTERFACE |
| COMMUNICATION DEVICE 21 | 213-1 | COMMUNICATION DEVICE 22 | 223-1 |
| COMMUNICATION DEVICE 22 | 223-2 | COMMUNICATION DEVICE 2x | 2x3-1 |

NETWORK SETTING INFORMATION DATABASE 31 (Ic)

| DEVICE | INTERFACE | DEVICE SETTING CONFIGURATION INFORMATION |
|---|---|---|
| COMMUNICATION DEVICE 21 | 213-1 | [SETTING 213-1] |
| COMMUNICATION DEVICE 22 | 223-1 | [SETTING 223-1] |
| COMMUNICATION DEVICE 22 | 223-2 | [SETTING 223-2] |
| COMMUNICATION DEVICE 2x | 2x3-1 | [SETTING 2x3-1] |

Fig. 13

ADJACENT DEVICE INFORMATION DATABASE 33 (In)

| CORRESPONDING DEVICE INFORMATION | | ADJACENT DEVICE INFORMATION | |
|---|---|---|---|
| DEVICE | INTERFACE | DEVICE | INTERFACE |
| COMMUNICATION DEVICE 21 | ~~213-1~~ 213-n | COMMUNICATION DEVICE 22 | 223-1 |
| COMMUNICATION DEVICE 22 | 223-1 | COMMUNICATION DEVICE 21 | ~~213-1~~ 213-n |
| COMMUNICATION DEVICE 22 | 223-2 | COMMUNICATION DEVICE 2x | 2x3-1 |
| COMMUNICATION DEVICE 2x | 2x3-1 | COMMUNICATION DEVICE 22 | 223-2 |

NETWORK CONNECTION INFORMATION DATABASE 32 (Ii)

| DEVICE A | | DEVICE B | |
|---|---|---|---|
| DEVICE | INTERFACE | DEVICE | INTERFACE |
| COMMUNICATION DEVICE 21 | 213-1 | COMMUNICATION DEVICE 22 | 223-1 |
| COMMUNICATION DEVICE 22 | 223-2 | COMMUNICATION DEVICE 2x | 2x3-1 |

NETWORK SETTING INFORMATION DATABASE 31 (Ic)

| DEVICE | INTERFACE | DEVICE SETTING CONFIGURATION INFORMATION |
|---|---|---|
| COMMUNICATION DEVICE 21 | 213-1 | [SETTING 213-1] |
| COMMUNICATION DEVICE 22 | 223-1 | [SETTING 223-1] |
| COMMUNICATION DEVICE 22 | 223-2 | [SETTING 223-2] |
| COMMUNICATION DEVICE 2x | 2x3-1 | [SETTING 2x3-1] |

Fig. 14

DEVICE SETTING CONTROL DEVICE, NETWORK SYSTEM, DEVICE SETTING METHOD, AND PROGRAM

CROSS-REFERENCE TO RELATED APPLICATIONS

This application is a National Stage application under 35 U.S.C. § 371 of International Application No. PCT/JP2019/038886, having an International Filing Date of Oct. 2, 2019, which claims priority to Japanese Application Serial No. 2018-194785, filed on Oct. 16, 2018. The disclosure of the prior application is considered part of the disclosure of this application, and is incorporated in its entirety into this application.

TECHNICAL FIELD

The present disclosure relates to a network system adapted to generate a device setting configuration in accordance with a wiring between communication devices.

BACKGROUND ART

In order to correctly set up and operate communication devices, it is necessary for the two of the "physical wirings" for connecting a plurality of machines with cables or the like and the "device setting configurations" to be input to the devices using command line or the like be made to conform to each other.

For example, a case in which communication is performed using an interface 1 of a communication device 1 and an interface 1 of a communication device 2 therebetween will be considered. In this case, it is necessary to input device setting configurations to the interface 1 of the communication device 1 and the interface 1 of the communication device 2 and to connect a wiring between the interface 1 of the communication device 1 and the interface 1 of the communication device 2 with a communication cable such as an optical fiber. In a case in which a wiring is connected between an interface other than the interface 1 of the communication device 1 and the interface 1 of the communication device 2, or in a case in which a wiring is connected between the interface 1 of the communication device 1 and an interface other than the interface 1 of the communication device 2, communication is not correctly established, and it is not possible to provide a desired network service.

It is desirable to eliminate human errors, such as connection errors as described above, to the maximum extent. Typically, identification tags or the like are added to communication cables, and operations of connecting communication devices are performed after checking combinations of interfaces of the devices to be connected and communication cables several times, in order to prevent human errors. On the other hand, there are problems such as a decrease in operation efficiency and a difficulty of completely eliminating human error even if checking is performed several times.

As a means for preventing human errors such as connection errors as a network system, for example, a loopback detection function in a layer 2 communication device may be exemplified. In a layer 2 network, a path between a certain device and another device on the network is uniquely defined, and communication through a plurality of paths is not allowed. This is because when a network system in which a plurality of paths are present is configured, a loop due to the aforementioned plurality of paths may be generated and a broadcast storm may occur. As one method for solving such a problem, an Ethernet (trade name) loop detection function (Patent Literature 1, for example) and a spanning tree protocol are exemplified. By using a loop detection function, it is possible to detect an Ethernet loop due to a connection error, but there may be a problem that it is not possible to handle a connection error such as a connection error that does not cause a loop.

From the viewpoint of preventing human connection errors, an approach of automating operations of connecting wirings between communication devices without any manual operations is also conceivable. On the other hand, solutions to multiple problems and expensive initial investment are needed to automate the operations of connecting wirings between communication devices.

Thus, automatically generating device setting configurations in accordance with wirings rather than automating the wiring operations may be conceived as a method for handling various connection errors. This enables desired communication using alternative interfaces even in a case in which connection errors occur.

For the aforementioned example, in a case in which a wiring is connected between the interface 2 of the communication device 1 and the interface 1 of the communication device 2 in a state in which the device setting configuration for the interface 1 of the communication device 1 and the device setting configuration for the interface 1 of the communication device 2 are prepared, it is possible to establish communication by modifying a device setting configuration for the interface 1 of the communication device 1 and reflecting the modified device setting configuration in the interface 2 of the communication device 1.

If it is possible to determine an interface in which a device setting configuration is to be reflected in accordance with a wiring, it is possible to simplify the process of the wiring operation itself. In other words, it is possible not only to eliminate a need to perform a checking operation in relation to wirings but also to respond to a request to establish a communication path by connecting communication devices with communication cables in advance and allowing each of the devices to select an appropriate interface and reflect the device setting configuration therein when the request to establish the communication path occurs.

CITATION LIST

Patent Literature

Patent Literature 1: JP 5254196 B

SUMMARY OF THE INVENTION

Technical Problem

The present disclosure is made in view of the aforementioned circumstances, and an object thereof is to provide a means for causing wirings and device setting configurations to conform between communication devices and then establishing communication by generating a device setting configuration in accordance with the wirings between the communication devices and reflecting the device setting configuration in interfaces of the communication devices.

Means for Solving the Problem

In order to achieve the aforementioned object, aspects of the present disclosure include the following components. In other words, in an interface of each communication device, information regarding an adjacent device connected directly via a communication cable is acquired, and device setting data for establishing communication between communication devices is generated based on the acquired adjacent device information.

Specifically, a device setting control device according to the present disclosure includes a network setting information database configured to hold, in an associated manner, information regarding a first communication device, information regarding an adjacent device that is a second communication device connected directly to the first communication device via a communication cable, and information regarding a device setting configuration to be set for an interface of the first communication device used to connect to the adjacent device, an adjacent device information database configured to store, collected by the first communication device, information regarding the adjacent device and an interface of the adjacent device, a device setting configuration generation unit configured to refer to the network setting information database to acquire information regarding a device setting configuration defined by a combination of a communication device that is a target of setting and an adjacent device of the communication device, refer to the adjacent device information database to acquire information regarding an interface connected to the adjacent device of the communication device that is the target of setting from among interfaces included in the communication device that is the target of setting, and generate a device setting configuration for the interface acquired from the adjacent device information database based on the information regarding the device setting configuration acquired from the network setting information database, and a device setting configuration instruction unit configured to provide an instruction for transmitting the device setting configuration generated by the device setting configuration generation unit to the communication device that is the target of setting and causing the device setting configuration generated by the device setting configuration generation unit to be reflected to the communication device that is the target of setting.

Specifically, a device setting control device according to the present disclosure includes a network setting information database configured to hold, in an associated manner, information regarding a first communication device and an interface of the first communication device and information regarding a device setting configuration to be set for the interface of the first communication device, a network connection information database configured to hold, in an associated manner, information regarding the first communication device, information regarding an adjacent device that is a second communication device expected to be established a connection directly to the first communication device via a communication cable, and information regarding respective interfaces of the first communication device and the adjacent device used for the connection, an adjacent device information database configured to store, collected by the first communication device, information regarding the adjacent device and an interface of the adjacent device, a device setting configuration generation unit configured to refer to the adjacent device information database to acquire information regarding an interface connected to the adjacent device from among interfaces included in a communication device that is a target of setting, refer to the network connection information database to acquire a combination of a third communication device and an interface of the third communication device defined by a combination of the adjacent device of the communication device that is the target of setting and an interface of the adjacent device, refer to the network setting information database to acquire information regarding a device setting configuration of the third communication device and the interface of the third communication device acquired from the network connection information database, and generate a device setting configuration of an interface connected to the adjacent device of the communication device that is the target of setting based on the information regarding the device setting configuration acquired from the network setting information database, and a device setting configuration instruction unit configured to provide an instruction for transmitting the device setting configuration generated by the device setting configuration generation unit to the communication device that is the target of setting and causing the device setting configuration generated by the device setting configuration generation unit to be reflected to the communication device that is the target of setting.

Specifically, a network system according to the present disclosure is a network system in which the device setting control device according to the present disclosure is connected to a plurality of communication devices, each of the plurality of communication devices including a device setting configuration reflecting unit configured to perform setting of an interface connected to an adjacent device that is a communication device connected directly to a communication device in which the device setting configuration reflecting unit is included via a communication cable based on the device setting configuration received from the device setting configuration instruction unit included in the device setting control device, and an adjacent device information acquisition unit configured to notify the device setting control device of information regarding interfaces of a communication device in which the adjacent device information acquisition unit is included and the adjacent device.

Specifically, a device setting method according to the present disclosure is a device setting method performed by a device setting control device including a network setting information database configured to hold, in an associated manner, information regarding a first communication device, information regarding an adjacent device that is a second communication device connected directly to the first communication device via a communication cable, and information regarding a device setting configuration to be set for an interface of the first communication device used to connect to the adjacent device, and an adjacent device information database configured to store, collected by the first communication device, information of the adjacent device and an interface of the adjacent device, the method including defining a combination of a communication device that is a target of setting of a device setting configuration and an adjacent device that is a communication device connected directly to the communication device that is the target of setting via a communication cable, referring to the network setting information database to acquire information regarding a device setting configuration defined by the combination of the communication device that is the target of setting and the adjacent device of the communication device that is the target of setting, referring to the adjacent device information database to acquire information regarding an interface connected to the adjacent device of the communication device that is the target of setting from among interfaces included in the communication device that is the target of setting, generating a device setting configuration for the interface acquired from the adjacent device information database based on the information regarding the device setting configuration acquired from the network setting information database, and providing an instruction for transmitting the device setting configuration that is generated to the communication device that is the target of setting and causing the device setting configuration that is generated to be reflected to the communication device that is the target of setting.

Specifically, a device setting method according to the present disclosure is a device setting method executed by a device setting control device including a network setting information database configured to hold, in an associated manner, information regarding a first communication device and an interface of the first communication device and information regarding a device setting configuration to be set for the interface of the first communication device, a network connection information database configured to hold, in an associated manner, information regarding the first communication device, information regarding an adjacent device that is a second communication device expected to be established a connection directly to the first communication device via a communication cable, and information regarding respective interfaces of the first communication device and the adjacent device used for the connection, and an adjacent device information database configured to store, collected by the first communication device, information regarding the adjacent device and an interface, the method including, referring to the adjacent device information database to acquire information regarding an interface connected to the adjacent device from among interfaces included in a communication device that is the target of setting, referring to the network connection information database to acquire a combination of a third communication device and an interface of the third communication device defined by a combination of the adjacent device of the communication device that is the target of setting and an interface of the adjacent device, referring to the network setting information database to acquire information regarding a device setting configuration of the third communication device and the interface of the third communication device acquired from the network connection information database, generating a device setting configuration of an interface connected to the adjacent device of the communication device that is the target of setting based on the information regarding the device setting configuration acquired from the network setting information database and providing an instruction for transmitting the device setting configuration that is generated to the communication device that is the target of setting and causing the device setting configuration that is generated to be reflected to the communication device that is the target of setting.

Specifically, a program according to the present disclosure is a program that causes a computer to operate as respective functional units included in the device setting control device according to the present disclosure.

Effects of the Invention

According to the present disclosure, it is possible to generate a device setting configuration in accordance with a wiring of a communication device and to reflect the device setting configuration in an interface of the communication device.

BRIEF DESCRIPTION OF DRAWINGS

FIG. 4 is a diagram illustrating an example of information that a network setting information database holds.

FIG. 5 is a diagram illustrating an example of information that an adjacent device information database holds.

FIG. 9 is a diagram illustrating an example of information that a network setting information database holds.

FIG. 10 is a diagram illustrating an example of information that a network connection information database holds.

FIG. 13 is a diagram illustrating an application example in the device setting configuration generation unit.

FIG. 14 is a diagram illustrating an application example in the device setting configuration generation unit.

DESCRIPTION OF EMBODIMENTS

Hereinafter, a network system according to embodiments of the present disclosure in which a device setting configuration in accordance with a connection status of communication devices is generated and reflected will be described with reference to the drawings. Note that parts with the same numbers applied thereto will not be repeatedly described in the following embodiments on the assumption that the parts perform similar operations. In this specification and the drawings, constituent elements having the identical reference signs are assumed to be the same.

Figure 1:
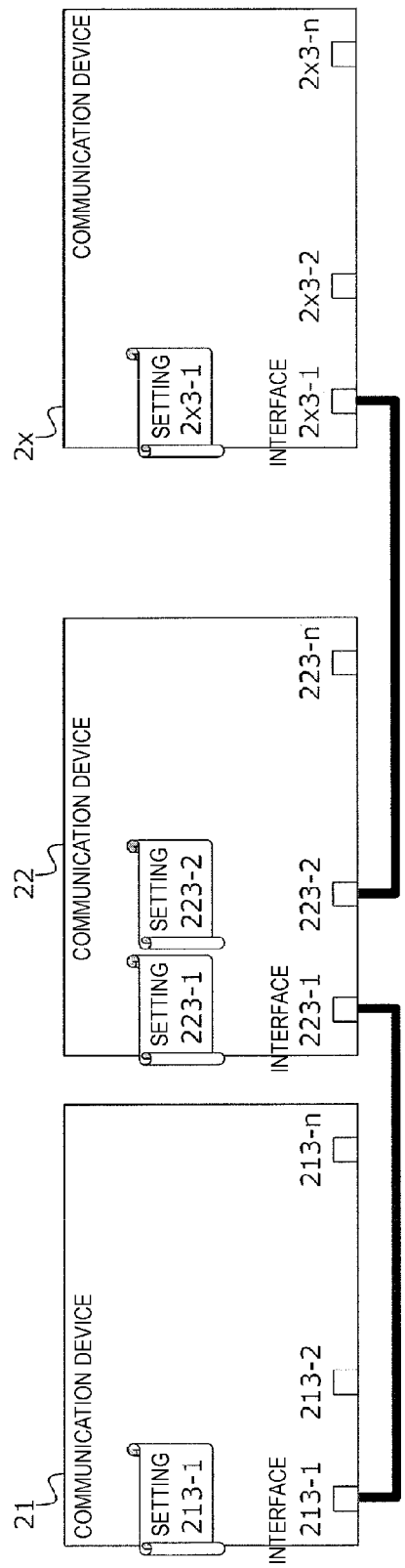
FIG. 1 is a diagram illustrating an example of a setting change reflecting method performed when a wiring is correctly connected.
Figure 2:
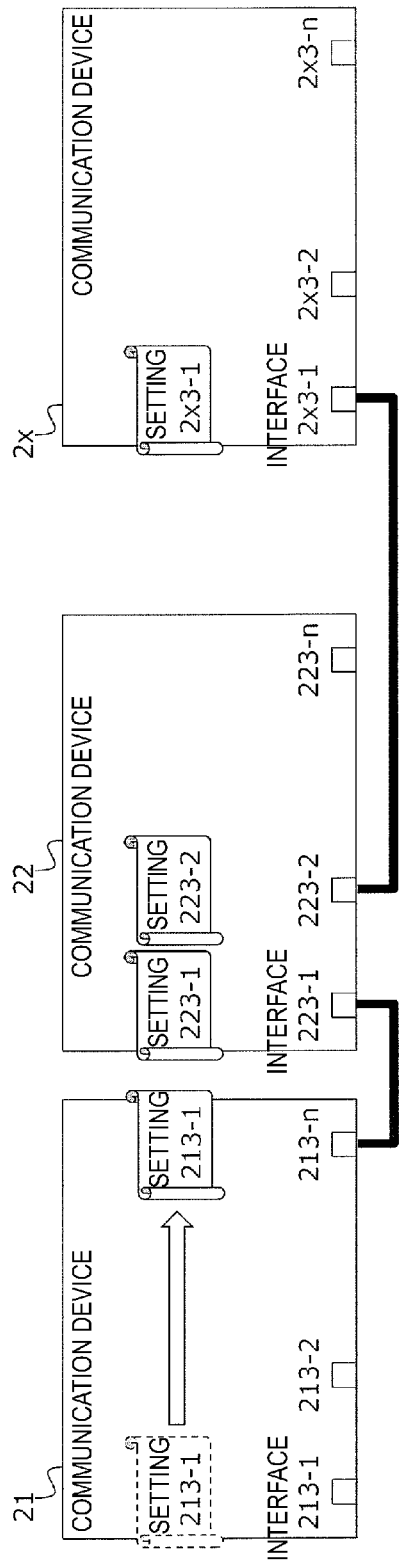
FIG. 2 is a diagram illustrating an example of a setting change reflecting method performed when an unscheduled wiring is connected.

FIGS. 1 and 2 illustrate an example where communication is continued by changing an interface to which a device setting configuration is to be reflected when a connection error of a communication cable occurs.

In the example of FIGS. 1 and 2, a state in which a communication cable to be connected to an interface 213-1 as illustrated in FIG. 1 has been erroneously connected to an interface 213-n as illustrated in FIG. 2 is illustrated. In this case, a setting 213-1 that is a device setting configuration scheduled to be set for the interface 213-1 is reflected in the interface 213-n after the format thereof is converted into a format of a device setting configuration that can be set for the interface 213-n as illustrated in FIG. 2 according to the present disclosure. This enables communication to be established between a communication device 21 and a communication device 22 even in a case in which a human error has occurred in connection of the communication cable.

First Embodiment

Figure 3:
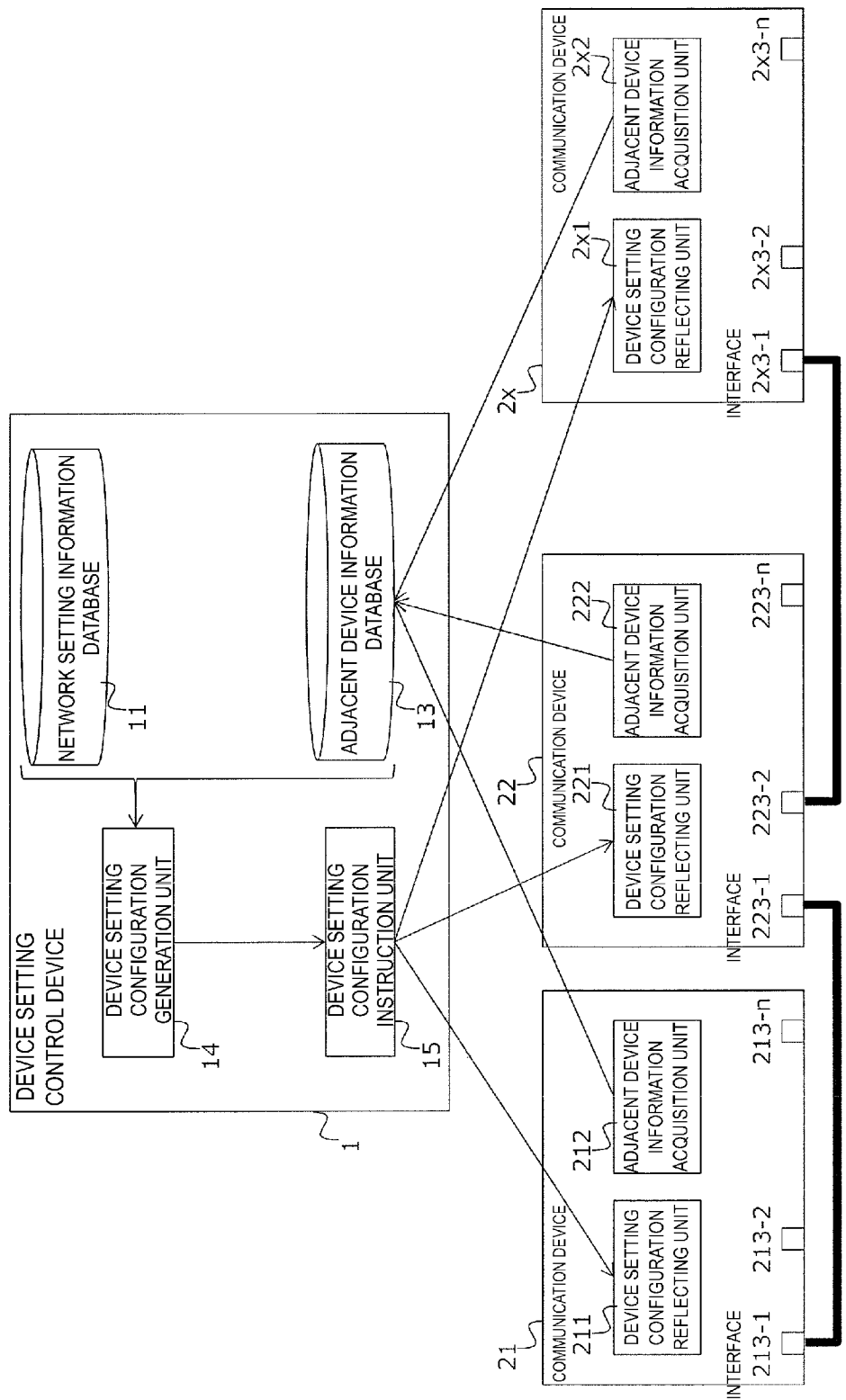
FIG. 3 is a diagram illustrating a network system adapted to generate and reflect a device setting configuration in accordance with a connection status of a communication device.

FIG. 3 illustrates a network system in which device setting configurations in accordance with connection statuses of a plurality of communication devices are generated and reflected in the communication devices.

FIG. 3 illustrates a network system, which includes a device setting control device 1 and a plurality of communication devices 21, 22, and 2*x*, in which each of the devices includes the following components.

The device setting control device 1 includes a network setting information database 11, an adjacent device information database 13, a device setting configuration generation unit 14, and a device setting configuration instruction unit 15.

The communication device 21 includes a device setting configuration reflecting unit 211, an adjacent device information acquisition unit 212, and a plurality of interfaces 213-1 to 213-*n*.

The communication device 22 includes a device setting configuration reflecting unit 221, an adjacent device information acquisition unit 222, and a plurality of interfaces 223-1 to 223-*n*.

The communication device 2*x* includes a device setting configuration reflecting unit 2*x*1, an adjacent device information acquisition unit 2*x*2, and a plurality of interfaces 2*x*3-1 to 2*x*3-*n*. Here, n is an integer that is equal to or greater than one, and x is an integer that is equal to or greater than two.

The network setting information database 11 holds device setting configuration information Ic set for each communication device (hereinafter, referred to as an adjacent device) connected directly to the communication device. For example, the network setting information database 11 is a database configured to hold the following four pieces of information as illustrated in FIG. 4.

First, the network setting information database 11 holds a [setting 213-1] as device setting configuration information Ic set for any interface of the communication device 21 in which the adjacent device is the communication device 22.

Second, the network setting information database 11 holds a [setting 223-1] as device setting configuration information Ic set for any interface of the communication device 22 in which the adjacent device is the communication device 21.

Third, the network setting information database 11 holds a [setting 223-2] as device setting configuration information Ic set for any interface of the communication device 22 in which the adjacent device is the communication device 2*x*.

Fourth, the network setting information database 11 holds a [setting 2*x*3-1] as device setting configuration information Ic set for any interface of the communication device 2*x* in which the adjacent device is the communication device 22.

The adjacent device information database 13 holds adjacent device information In that the adjacent device information acquisition unit of the communication device collects. The adjacent device information In includes information regarding interfaces of the communication device and the adjacent device that are connected directly to each other via a communication cable. The adjacent device information database 13 is a database including the following four pieces of information as the adjacent device information In as illustrated in FIG. 5, for example. First information is information that the device and the interface connected directly to the interface 213-1 of the communication device 21 are the communication device 22 and the interface 223-1.

Second information is information that the device and the interface connected directly to the interface 223-1 of the communication device 22 are the communication device 21 and the interface 213-1.

Third information is information that the device and the interface connected directly to the interface 223-2 of the communication device 22 is the communication device 2*x* and the interface 2*x*3-1.

Fourth information is information that the device and the interface connected directly to the interface 2*x*3-1 of the communication device 2*x* are the communication device 22 and the interface 223-2.

It is necessary to acquire information regarding a communication device connected directly to an interface to generate the adjacent device information database 13. To do this, there is a method of causing a discovery protocol to operate in the adjacent device information acquisition unit in each communication device. For example, a link layer discovery protocol (LLDP) defined by IEEE 802.1AB may be used as a method for acquiring information regarding a communication device to which direct connection is established.

The device setting configuration generation unit 14 generates a device setting configuration to be set for each interface of each device based on the network setting information database 11 and the adjacent device information database 13. A detailed processing for generating a device setting configuration will be described below.

In order to reflect the device setting configuration generated by the device setting configuration generation unit 14 to each device, the device setting configuration instruction unit 15 transmits the generated device setting configuration to each communication device. The device setting configuration reflecting unit of each communication device (for example, the device setting configuration reflecting unit 211 in the case of the communication device 21) performs setting and activation of the setting based on the device setting configuration received from the device setting control device 1.

Figure 6:
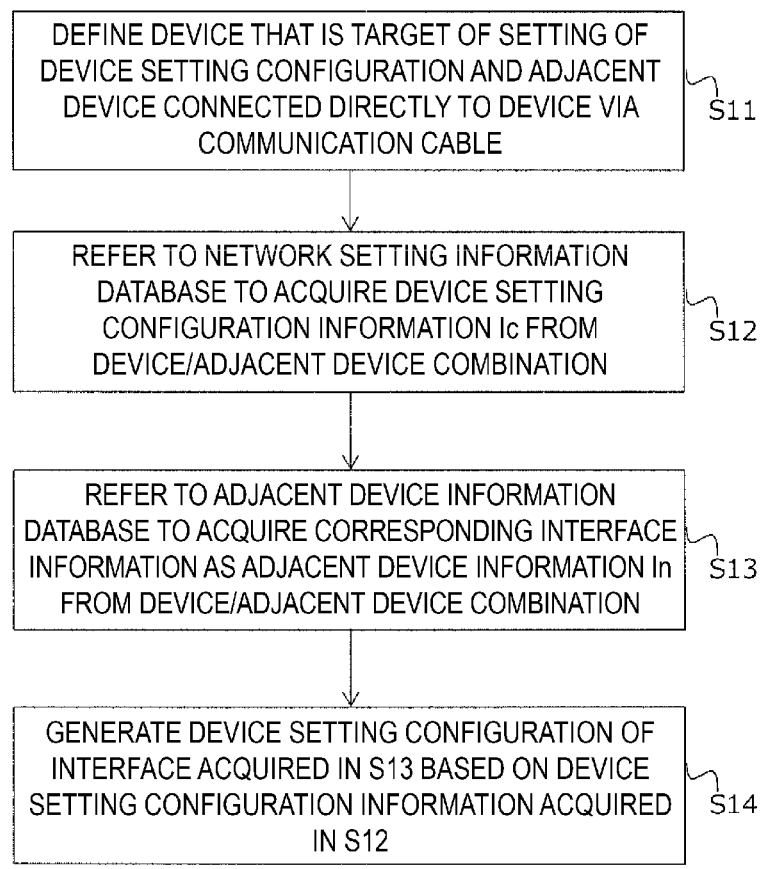
FIG. 6 is a diagram illustrating an example of a flowchart performed by a device setting configuration generation unit.

FIG. 6 illustrates a flowchart related to generation of a device setting configuration to be set for an interface of a communication device performed by the device setting configuration generation unit 14. In FIG. 6, a case in which a wiring is connected as illustrated in FIG. 1 will be considered.

First, a combination of a device that is a target of setting of a device setting configuration and an adjacent device connected directly to the device via a communication cable is defined (S11). This combination will be referred to as a device/adjacent device combination. Here, the combination of the device that is the target of setting of the device setting configuration and the adjacent device may freely be selected. An object of the first embodiment is to generate and reflect, when an interface A1 of a device A and an interface B1 of an adjacent device B1 are connected to each other via a communication cable, a device setting configuration to be set for the interface A1 and the interface B1. Thus, the present disclosure can be applied not only to the case in which a wiring error occurs, but also to a method of use in which communication devices are connected to each other via a communication cable in advance and each of the devices select an appropriate interface to reflect a device setting configuration when a request for establishing a communication path occurs. Hereinafter, an exemplary case in which a target of setting is the communication device 21 (or the communication device 22), an adjacent device is the communication device 22 (or the communication device 21), and a device setting configuration to be set for the interface 213-1 of the communication device 21 (or the interface 223-1 of the communication device 22) is generated will be described.

Next, the device setting configuration information Ic is acquired from a device/adjacent device combination with reference to the network setting information database 11 (S12). The network setting information database according to the first embodiment holds network setting information data in a form of "a device setting configuration to be set for interfaces of a device A and a device B other than the device A". The network setting information database is thus retrieved using the device/adjacent device combination defined in S11 as a retrieval key, and the device setting configuration information Ic is acquired.

Figure 7:
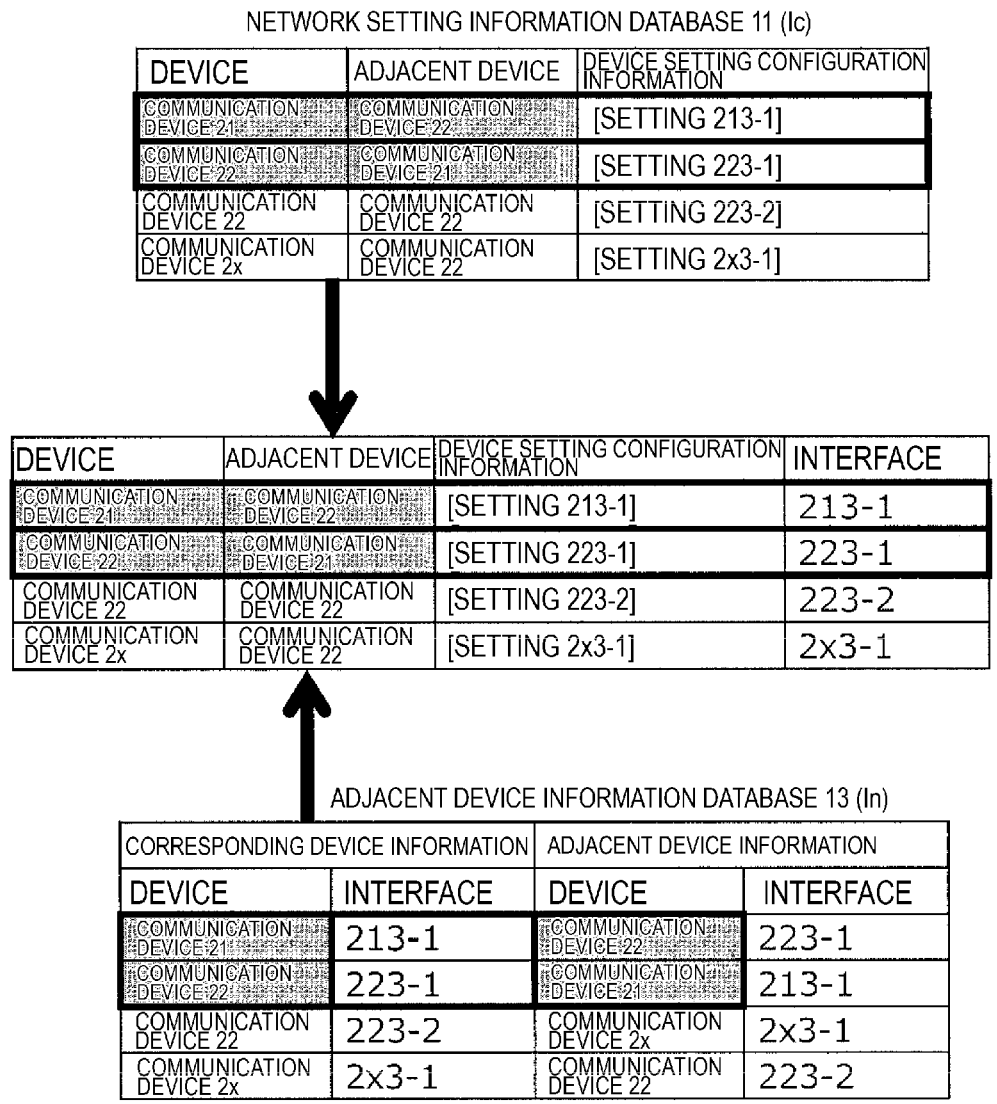
FIG. 7 is a diagram illustrating an application example in the device setting configuration generation unit.

According to the network setting information database 11 illustrated in FIG. 7, for example, under a condition that the setting target is the communication device 21 and the adjacent device is the communication device 22, the device setting configuration information Ic to be set for the communication device 21 is the [setting 213-1]. Also, under a condition that the setting target is the communication device 22 and the adjacent device is the communication device 21, the device setting configuration information Ic to be set for the communication device 22 is the [setting 223-1].

Next, information of the corresponding interfaces is acquired as adjacent device information In from the device/adjacent device combination with reference to the adjacent device information database 13 (S13). At this time, the adjacent device information database 13 is searched using the device/adjacent device combination defined in S11 as a retrieval key, and information regarding the interfaces for which setting is performed is acquired. A device setting configuration of the interfaces acquired in Step S13 is generated based on the device setting configuration information Ic acquired in Step S12 (S14).

According to the adjacent device information database 13 illustrated in FIG. 7, for example, an interface that can communicate directly between the communication device 21 and the communication device 22 via a communication cable, that is, an interface for which a device setting configuration is to be set in the communication device 21 is the interface 213-1. Also, an interface that can communicate directly between the communication device 22 and the communication device 21 via a communication cable, that is, an interface for which a device setting configuration is to be set in the communication device 22 is the interface 223-1.

Note that a configuration in which connection is established between the two communication device A and communication device B using a plurality of communication cables is also conceivable. In other words, a state in which the interface A1 of the communication device A and the interface B1 of the communication device B are directly connected to each other via a communication cable and the interface A2 of the communication device A and the interface B2 of the communication device B are also directly connected to each other via a communication cable is conceivable. In this case, a device setting configuration may be reflected in each of the interface A1 and the interface B1, or a device setting configuration may be reflected in each of the interface A2 and the interface B2. In order to achieve this, any one combination is selected in a case in which a plurality of candidate combinations of interfaces are present in Step S12 of the flowchart performed by the device setting configuration generation unit 14.

A case in which another device setting configuration has already been set for interfaces connected via a communication cable is also conceivable. In other words, a state in which the following three events occur at the same time is conceivable. The first event is an event that the interface A1 of the communication device A and the interface B1 of the communication device B have been connected directly via a communication cable. The second event is an event that the interface A2 of the communication device A and the interface B2 of the communication device B have also been connected directly via a communication cable. The third event is an event that a device setting configuration has already been set for each of the interface A1 of the communication device A and the interface B1 of the communication device B. In this case, information regarding the corresponding interfaces is acquired from a device/adjacent device combination in a state where interfaces for which the device setting configuration has already been set, that is, the interface A1 of the communication device A and the interface B1 of the communication device B are excluded.

According to the aforementioned processing, in a case in which the communication device 21 and the communication device 22 are connected directly via a communication cable, it is possible to generate device setting configurations to be set for the interface of the communication device 21 connected directly to the communication device 22 and the interface of the communication device 22 connected directly to the communication device 21 as illustrated in FIG. 7. In other words, it is possible to ascertain that the device setting configuration information to be set for the communication device 21 is the [setting 213-1] and the target interface is the interface 213-1. Also, it is possible to ascertain that the device setting configuration information to be set for the communication device 22 is the [setting 223-1] and the target interface is the interface 223-1.

In the first embodiment, pieces of information in the network setting information database 11 and the adjacent device information database 13 are used. In other words, the device setting configuration information Ic is held in the form of the "setting between two communication devices connected directly via a communication cable", and a combination of the interface and the device setting configuration information is appropriately selected based on the connection status of the communication cable when the device setting is reflected.

In a case in which an unscheduled wiring is connected as illustrated in FIG. 2, for example, interfaces that can communicate directly via a communication cable between the communication device 21 and the communication device 22 according to the adjacent device information database 13 illustrated in FIG. 7 are the interfaces 213-n and 223-1. In this case, the device setting configuration generation unit 14 sets, for the interface 213-n, the device setting configuration generated based on the device setting configuration information [setting 213-1] to be set for the communication device 21.

Such a method can be used in a use case in which a wiring error occurs when a wiring such as a communication cable is changed after a state where communication is correctly established is achieved, for example. Further, such a method can also be used in a use case in which communication devices are connected via a communication cable in advance, and when a request for establishing a communication path occurs, each of the devices selects an appropriate interface to reflect a device setting configuration therein, for example. Note that, in a case in which a plurality of combinations between interfaces and device setting configuration information Ic are present, it is necessary to specify an interface in which device setting is to be reflected.

Second Embodiment

Figure 8:
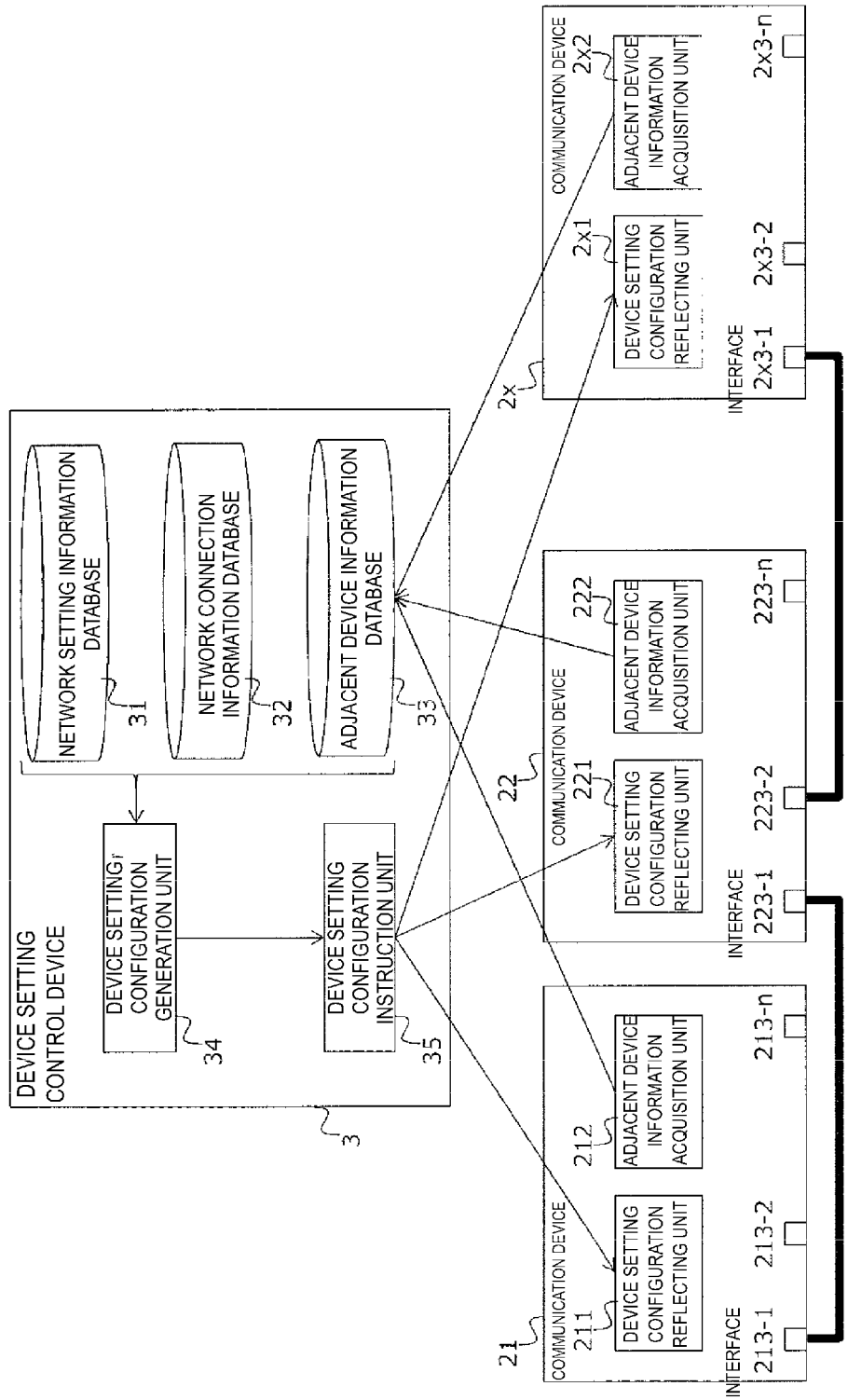
FIG. 8 is a diagram illustrating a network system adapted to generate and reflect a device setting configuration in accordance with a connection status of a communication device.

FIG. 8 illustrates a network system in which a device setting configuration is generated and reflected in a plurality of communication devices in accordance with a connection status of the communication devices.

FIG. 8 illustrates a network system, which includes a device setting control device 3 and a plurality of communication devices 21, 22, and 2x, in which each of the devices includes the following components.

The device setting control device 3 includes a network setting information database 31, a network connection information database 32, an adjacent device information database 33, a device setting configuration generation unit 34, and a device setting configuration instruction unit 35.

The communication device 21 includes a device setting configuration reflecting unit 211, an adjacent device information acquisition unit 212, and a plurality of interfaces 213-1 to 213-n.

The communication device 22 includes a device setting configuration reflecting unit 221, an adjacent device information acquisition unit 222, and a plurality of interfaces 223-1 to 223-n.

The communication device 2x includes a device setting configuration reflecting unit 2x1, an adjacent device information acquisition unit 2x2, and a plurality of interfaces 2x3-1 to 2x3-n.

Here, n is an integer that is equal to or greater than one, and x is an integer that is equal to or greater than two.

The network setting information database 31 holds information regarding interfaces of communication devices and device setting configuration information Ic to be set for the corresponding interfaces. For example, the network setting information database 31 is a database configured to hold the following four pieces of information as illustrated in FIG. 9.

First, the network setting information database 31 holds information regarding the interface 213-1 of the communication device 21 (the interface to be connected to the interface 223-1 of the communication device 22) and a [setting 213-1] that is the device setting configuration information Ic of the interface in an associated manner.

Second, the network setting information database 31 holds information regarding the interface 223-1 of the communication device 22 (the interface to be connected to the interface 213-1 of the communication device 21) and a [setting 223-1] that is the device setting configuration information Ic of the interface in an associated manner.

Third, the network setting information database 31 holds the interface 223-2 of the communication device 22 (the interface to be connected to the interface 2x3-1 of the communication device 2x) and a [setting 223-2] that is the device setting configuration information Ic of the interface in an associated manner.

Fourth, the network setting information database 31 holds the interface 2x3-1 of the communication device 2x (the interface to be connected to the interface 223-2 of the communication device 22) and a [setting 2x3-1] that is the device setting configuration information Ic of the interface in an associated manner.

The network connection information database 32 holds information Ii regarding two communication devices and interfaces thereof expected to be connected directly via a communication cable. As illustrated in FIG. 10, for example, the network connection information database 32 is a database including the following two pieces of information as device/interface information Ii.

First information is information that the interface 213-1 of the communication device 21 and the interface 223-1 of the communication device 22 are connected directly to each other.

Second information is information that the interface 223-2 of the communication device 22 and the interface 2x3-1 of the communication device 2x are connected directly to each other.

Figures 11, 12:
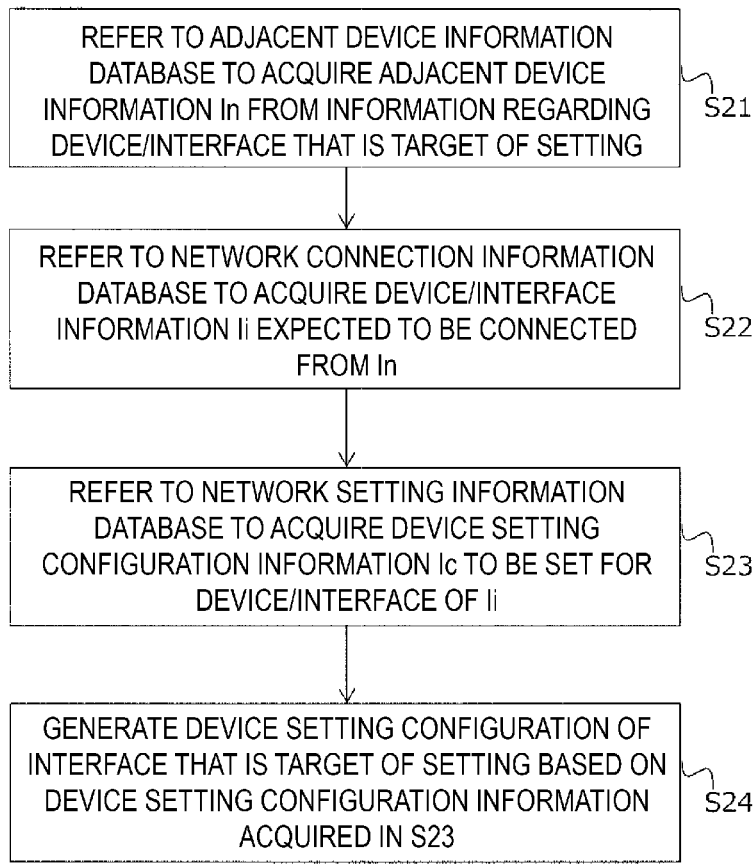
FIG. 11 is a diagram illustrating an example of information that an adjacent device information database holds.
FIG. 12 is a diagram illustrating an example of a flowchart performed by a device setting configuration generation unit.

The adjacent device information database 33 holds adjacent device information In that the adjacent device information acquisition unit of the communication device collects. The adjacent device information In includes information regarding interfaces of the communication device and the adjacent device that are connected directly to each other via a communication cable. For example, the adjacent device information database 33 is a database including the following four pieces of information as adjacent device information In as illustrated in FIG. 11.

First information is information that the device and the interface connected directly to the interface 213-1 of the communication device 21 are the communication device 22 and the interface 223-1.

Second information is information that the device and the interface connected directly to the interface 223-1 of the communication device 22 are the communication device 21 and the interface 213-1.

Third information is information that the device and the interface connected directly to the interface 223-2 of the communication device 22 are the communication device 2x and the interface 2x3-1.

Fourth information is information that the device and the interface connected directly to the interface 2x3-1 of the communication device 2x are the communication device 22 and the interface 223-2.

It is necessary to acquire information regarding a communication device connected directly to the interface to generate the adjacent device information database 33. To do this, there is a method of causing a discovery protocol to operate in the adjacent device information acquisition unit in each communication device. For example, a link layer discovery protocol (LLDP) defined by IEEE 802.1AB may be used as a method for acquiring information regarding a communication device to which direct connection is established.

The device setting configuration generation unit 34 generates a device setting configuration to be set for each interface of each device based on the network setting information database 31, the network connection information database 32, and the adjacent device information database 33. A detailed processing for generating a device setting configuration will be described below.

In order to reflect the device setting configuration generated by the device setting configuration generation unit 34 in each device, the device setting configuration instruction unit 35 transmits the generated device setting configuration to each communication device. The device setting configuration reflecting unit of each communication device (for example, the device setting configuration reflecting unit 211 in the case of the communication device 21) performs setting and activation of the setting based on the device setting configuration received from the device setting control device 3.

FIG. 12 illustrates a flowchart related to generation of a device setting configuration to be set for an interface of a communication device performed by the device setting configuration generation unit 34. FIG. 13 illustrates an application example in the device setting configuration generation unit. In FIG. 12, a case in which a wiring is connected as illustrated in FIG. 1 will be considered.

First, the adjacent device information In is acquired from information regarding a device that is a target of setting and an interface thereof with reference to the adjacent device information database 33 (S21). The following description will be given using an exemplary case in which the setting target is the communication device 21, the adjacent device is the communication device 22, and a device setting configuration to be set for the interface 213-1 of the communication device 21 is generated. According to the adjacent device information database 33 illustrated in FIG. 13, the adjacent device information In to be acquired for the interface 213-1 of the communication device 21 is "the communication device 22, the interface 223-1".

Next, device/interface information Ii expected to have been connected is acquired from the adjacent device information In acquired in Step S21 with reference to the network connection information database 32 (S22). According to the network information connection database 32 illustrated in FIG. 13, the interface 213-1 of the communication device 21 and the interface 223-1 of the communication device 22 are expected to be connected directly via a communication cable. Thus, the adjacent device and the interface of "the communication device 22, the interface 223-1" are expected to be "the communication device 21, the interface 213-1".

The interface of the adjacent device is acquired as the adjacent device information In in Step S21, and the information regarding the adjacent device of the interface acquired in Step S21, that is, the interface expected to be the interface of the device itself, is acquired as the device/interface information Ii in Step S22.

Finally, device setting configuration information Ic expected to be set for the interface is acquired with reference to the network setting information database 31 as illustrated in FIG. 13 (S23). It is possible to ascertain that the device setting configuration information Ic of the interface 213-1 of the communication device 21 is the [setting 213-1]. The device setting configuration for the interface that is the target of setting is generated based on the device setting configuration information Ic acquired in Step S23 (S24). In the case of the example illustrated in FIG. 13, the device setting configuration for the interface 213-1 of the communication device 21 is generated based on the [setting 213-1].

According to the aforementioned processing, it is possible to ascertain that the device setting configuration information Ic to be set for the interface 213-1 of the communication device 21 is the [setting 213-1].

FIG. 14 illustrates a second application example in the device setting configuration generation unit. In FIG. 14, a case in which an unscheduled wiring is connected on the communication device 21 side as illustrated in FIG. 2 will be considered.

In comparison between FIGS. 14 and 13, two databases, namely the network setting information database 31 and the network connection information database 32 from among the network setting information database 31, the network connection information database 32, and the adjacent device information database 33 hold completely the same information. On the other hand, information held by the adjacent device information database 33 is different due to a physical difference of wirings.

Specifically, in the adjacent device information database 33, the information regarding the interface of the communication device 21 in the corresponding device information and the adjacent device information has been changed from 213-1 to 213-n. Thus, the adjacent device information of the interface 223-1 of the communication device 22 is "the communication device 21, the interface 213-n", and the adjacent device information of the interface 213-n of the communication device 21 is "the communication device 22, the interface 223-1".

Hereinafter, an exemplary case in which device setting configuration information Ic to be set for the interface 213-n of the communication device 21 is acquired will be described with reference to the flowchart illustrated in FIG. 12.

In Step S21, "the communication device 22, the interface 223-1" is acquired as the adjacent device information of the interface 213-n of the communication device 21 with reference to the adjacent device information database 33.

Next, in Step S22, the interface expected to be the interface of the device itself is expected to be the interface 213-1 of the communication device 21 with reference to the network connection information database 32.

Finally, it is possible to ascertain that the device setting configuration information Ic is the [setting 213-1] with reference to the network setting information database 31 in Step S23.

In Step S24, the device setting configuration for the interface 213-n is generated based on the device setting configuration information [setting 213-1]. This enables the device setting configuration as illustrated in FIG. 2.

According to the aforementioned processing, it is possible to ascertain that the device setting configuration information Ic to be set for the interface 213-n of the communication device 21 is the [setting 213-1].

In the second embodiment, pieces of information in the network setting information database 31, the network connection information database 32, and the adjacent device information database 33 are used. In other words, the device setting configuration for the device/interface is generated by acquiring the device setting configuration information Ic to be set for the device/interface connected directly to the interface of the adjacent device. Such a method can be used in a use case in which a wiring error occurs when a wiring such as a communication cable is changed after a state where communication is correctly established is achieved, for example. There is also a feature that, if the interface of the adjacent device is defined, the device setting configuration information to be set and the interface in which the setting is to be reflected are uniquely defined.

Note that, in a case in which unscheduled wirings are connected at the same time to both two communication devices connected directly via a communication cable, communication cannot be performed even if this embodiment is applied. However, a procedure in which one of the wirings out of the two communication devices connected directly via the communication cable is changed first, and after communication is established through the wiring, the other wiring is then changed is used in an actual operation. Thus, it is possible to avoid the situation in which communication cannot be performed by updating the information in the network connection information database 32 and the network setting information database 31 based on the information in the adjacent device information database 33 every time a wiring is changed and communication is established.

The device according to the present disclosure can be implemented using a computer and a program, and the program can be recorded in a recording medium or provided through a network.

INDUSTRIAL APPLICABILITY

The network system according to the present disclosure can be applied to information communication industries.

REFERENCE SIGNS LIST 1, 3 Device setting control device
11, 31 Network setting information database
32 Network connection information database
13, 33 Adjacent device information database
14, 34 Device setting configuration generation unit
15, 35 Device setting configuration instruction unit
21, 22, 2x Communication device
211, 222, 2x1 Device setting configuration reflecting unit
212, 222, 2x2 Adjacent device information acquisition unit
213-1, 213-2, 213-n, 223-1, 223-2, 223-n, 2x3-1, 2x3-2, 2x3-n Interface

The invention claimed is:

1. A device setting control device comprising:
one or more processors, and one or more storage devices storing instructions that when executed by the one or more processors, cause the one or more processors to function as units comprising:
a network setting information database configured to hold, in an associated manner, for each respective communication device in a plurality of communication devices, information regarding the respective communication device, information regarding a respective adjacent device of the respective communication device that is a communication device connected directly to the respective communication device via a communication cable, and information regarding a device setting configuration to be set for an interface of the respective communication device used to connect to the respective adjacent device;
an adjacent device information database configured to store, for each respective communication device in the plurality of communication devices, collected by the respective communication device, information regarding the respective adjacent device of the respective communication device and an interface of the respective adjacent device;
a device setting configuration generation unit configured to refer to the network setting information database to acquire information regarding a device setting configuration defined by a combination of a particular communication device in the plurality of communication device that is a target of setting and the respective adjacent device of the particular communication device that is the target of setting, refer to the adjacent device information database to acquire information regarding an interface connected to the respective adjacent device of the particular communication device that is the target of setting from among interfaces included in the particular communication device that is the target of setting, and generate a device setting configuration for the interface acquired from the adjacent device information database based on the information regarding the device setting configuration acquired from the network setting information database; and
a device setting configuration instruction unit configured to provide an instruction for transmitting the device setting configuration generated by the device setting configuration generation unit to the particular communication device that is the target of setting and causing the device setting configuration generated by the device setting configuration generation unit to be reflected to the particular communication device that is the target of setting;
wherein the device setting control device is connected to the plurality of communication devices, wherein each respective communication device in the plurality of communication devices comprises:
a respective adjacent device information acquisition unit configured to notify the device setting control device of information regarding interfaces of the respective communication device in which the respective adjacent device information acquisition unit is included and the respective adjacent device of the respective communication device.

2. The device setting control device of claim 1,
wherein each respective communication device of the plurality of communication devices further comprises:
a respective device setting configuration reflecting unit configured to perform setting of an interface connected to the respective adjacent device of the respective communication device that is a communication device connected directly to the respective communication device in which the respective device setting configuration reflecting unit is included via a communication cable based on the device setting configuration received from the device setting configuration instruction unit included in the device setting control device.

3. A device setting method performed by a device setting control device including
a network setting information database configured to hold, in an associated manner, for each respective communication device in a plurality of communication devices, information regarding the respective communication device, information regarding a respective adjacent device of the respective communication device that is a communication device connected directly to the respective communication device via a communication cable, and information regarding a device setting configuration to be set for an interface of the respective communication device used to connect to the respective adjacent device, and
an adjacent device information database configured to store, for each respective communication device in the plurality of communication devices, collected by the respective communication device, information regarding the respective adjacent device of the respective communication device and an interface of the respective adjacent device,
the method comprising:
defining a combination of a particular communication device in the plurality of communication device that is a target of setting of a device setting configuration and the respective adjacent device that is a communication device connected directly to the particular communication device that is the target of setting via a communication cable,
referring to the network setting information database to acquire information regarding a device setting configuration defined by the combination of the particular communication device that is the target of setting and the respective adjacent device of the particular communication device that is the target of setting;
referring to the adjacent device information database to acquire information regarding an interface connected to the respective adjacent device of the particular communication device that is the target of setting from among interfaces included in the communication device that is the target of setting;
generating a device setting configuration for the interface acquired from the adjacent device information database based on the information regarding the device setting configuration acquired from the network setting information database; and providing an instruction for transmitting the device setting configuration that is generated to the particular communication device that is the target of setting and causing the device setting configuration that is generated to be reflected to the particular communication device that is the target of setting;

wherein the device setting control device is connected to the plurality of communication devices, wherein each respective communication device in the plurality of communication devices comprises:

a respective adjacent device information acquisition unit configured to notify the device setting control device of information regarding interfaces of the respective communication device in which the respective adjacent device information acquisition unit is included and the respective adjacent device of the respective communication device.

4. A non-transitory computer readable medium storing a program that causes a computer to operate as respective functional units included in a device setting control device comprising:

a network setting information database configured to hold, in an associated manner, for each respective communication device in a plurality of communication devices, information regarding the respective communication device, information regarding a respective adjacent device of the respective communication device that is a communication device connected directly to the respective communication device via a communication cable, and information regarding a device setting configuration to be set for an interface of the respective communication device used to connect to the respective adjacent device;

an adjacent device information database configured to store, for each respective communication device in the plurality of communication devices, collected by the respective communication device, information regarding the respective adjacent device of the respective communication device and an interface of the respective adjacent device;

a device setting configuration generation unit configured to refer to the network setting information database to acquire information regarding a device setting configuration defined by a combination of a particular communication device in the plurality of communication device that is a target of setting and the respective adjacent device of the particular communication device that is the target of setting, refer to the adjacent device information database to acquire information regarding an interface connected to the respective adjacent device of the particular communication device that is the target of setting from among interfaces included in the particular communication device that is the target of setting, and generate a device setting configuration for the interface acquired from the adjacent device information database based on the information regarding the device setting configuration acquired from the network setting information database; and a device setting configuration instruction unit configured to provide an instruction for transmitting the device setting configuration generated by the device setting configuration generation unit to the particular communication device that is the target of setting and causing the device setting configuration generated by the device setting configuration generation unit to be reflected to the particular communication device that is the target of setting;

wherein the device setting control device is connected to the plurality of communication devices, wherein each respective communication device in the plurality of communication devices comprises:

a respective adjacent device information acquisition unit configured to notify the device setting control device of information regarding interfaces of the respective communication device in which the respective adjacent device information acquisition unit is included and the respective adjacent device of the respective communication device.

* * * * *